United States Patent [19]

Buethe et al.

[11] Patent Number: 4,478,960

[45] Date of Patent: Oct. 23, 1984

[54] DIPHENYLMETHANE DIISOCYANATE-BASED LIQUID POLYISOCYANATE MIXTURES CONTAINING URETHANE GROUPS, PROCESS FOR THEIR PREPARATION AND THEIR USE FOR THE PREPARATION OF FLEXIBLE POLYURETHANE FOAMS

[75] Inventors: Ingolf Buethe, Boehl-Iggelheim; Matthias Marx, Bad Durkheim; Gisbert Schleier, Ludwigshafen; Reinhard Peters, Munich, all of Fed. Rep. of Germany

[73] Assignee: BASF Aktiengesellschaft, Ludwigshafen, Fed. Rep. of Germany

[21] Appl. No.: 544,257

[22] Filed: Oct. 21, 1983

[30] Foreign Application Priority Data

Nov. 10, 1982 [DE] Fed. Rep. of Germany ....... 3241450

[51] Int. Cl.$^3$ ..................... C08G 18/14; C08G 18/70; C07C 143/828
[52] U.S. Cl. .......................... 521/160; 260/453 AR; 260/453 AM; 260/453 SP; 521/159; 521/161; 528/44; 528/67
[58] Field of Search ................. 528/67, 44; 521/159, 521/160, 161; 260/453 AR, 453 AM, 453 SP

[56] References Cited

U.S. PATENT DOCUMENTS

| | | | |
|---|---|---|---|
| 3,644,457 | 2/1972 | Koenig et al. | 528/44 |
| 4,055,548 | 10/1977 | Carleton et al. | 521/159 |
| 4,115,429 | 9/1978 | Reiff et al. | 521/159 |
| 4,118,410 | 10/1978 | Friedel et al. | 521/160 |
| 4,125,545 | 11/1978 | Kroplinski et al. | 260/404.5 |
| 4,163,095 | 7/1979 | Kuebens et al. | 528/67 |
| 4,190,711 | 2/1980 | Zdrahala et al. | 521/159 |
| 4,229,347 | 10/1980 | Holt et al. | 260/239 A |
| 4,237,240 | 12/1980 | Jarr et al. | 521/159 |
| 4,261,852 | 4/1981 | Carroll et al. | 528/67 |
| 4,365,025 | 12/1982 | Murch et al. | 528/67 |

FOREIGN PATENT DOCUMENTS

| | | |
|---|---|---|
| 0022617 | 1/1981 | European Pat. Off. . |
| 1444192 | 7/1976 | United Kingdom . |
| 1550325 | 9/1979 | United Kingdom . |

*Primary Examiner*—Herbert S. Cockeram
*Attorney, Agent, or Firm*—Joseph D. Michaels

[57] ABSTRACT

Diphenylmethane diisocyanate-based liquid polyisocyanate mixtures containing urethane groups and having an isocyanate content of from 12 to 30 percent by weight are obtained by reaction of a polyoxypropylene polyoxyethylene polyol containing 5 to 30 percent by weight of oxyethylene with diphenylmethane diisocyanate-based isocyanates. These polyisocyanate mixtures are storage stable at low temperature and yield flexible polyurethane foams having improved mechanical properties.

6 Claims, No Drawings

DIPHENYLMETHANE DIISOCYANATE-BASED LIQUID POLYISOCYANATE MIXTURES CONTAINING URETHANE GROUPS, PROCESS FOR THEIR PREPARATION AND THEIR USE FOR THE PREPARATION OF FLEXIBLE POLYURETHANE FOAMS

BACKGROUND OF THE INVENTION

1. Field of the Invention

This invention relates to the field of modified diphenylmethane diisocyanates. More specifically it relates to storage stable, liquid, urethane-modified polyisocyanates which yield polyurethanes with superior mechanical properties.

2. Description of the Prior Art

The preparation of diphenylmethane diisocyanate compounds which are liquid at room temperature is known. According to the data in German Patent No. 16 18 380 (U.S. Pat. No. 3,644,457), this is achieved by reacting one mole 4,4,'- and/or 2,4'-diphenylmethane diisocyanate, abbreviated below as MDI, with from 0.1 to 0.3 mole tripropylene glycol and/or polyoxypropylene glycol having a molecular weight up to 700.

In GB Patent No. 1,369,334, the modification is performed in two reaction steps. Dipropylene glycol and polyoxypropylene glycol with a molecular weight under 2000 are used a the modifying agents.

German Published application OS No. 29 13 126 (U.S. Pat. No. 4,229,347) teaches MDI compounds in which from 10 to 35 percent by weight of the isocyanate groups are reacted with a mixture consisting of at least 3 alkylene glycols and whereby one of these glycols is a di-, tri-, or higher polypropylene glycol.

In German Published application OS No. 24 04 116 (GB Pat. No. 1,430,455), on the other hand, mixtures of a polyoxyethylene glycol or a polyoxyethylene glycol mixture with an average molecular weight less than 650 and at least one alkylene glycol with at least 3 carbon atoms are cited as the modifying agent.

German Published application OS No. 23 46 996 (GB Pat. No. 1,377,679) relates to MDI compounds in which from 10 to 35 percent by weight of the isocyanate groups were reacted with a standard commercial polyethylene glycol.

In order to prepare liquid polyisocyanate compounds, the reaction of mixtures of diphenylmethane diisocyanates and polyphenylpolymethylene polyisocyanates, subsequently abbreviated as crude MDI, are also described in addition to MDI, with glycols and/or polyoxyalkylene glycols.

According to EP Published application No. 10 850, the polyisocyanate compounds of this type consist of a mixture of crude MDI with an MDI modified with polyoxyalkylene polyols having a functionality from 2 to 3 based on polyoxypropylene polyol and, in some cases, on polyoxyethylene polyol, and a molecular weight from 750 to 3000.

A liquid crude MDI compound is attained, according to DE AS No. 27 37 338 (U.S. Pat. No. 4,055,548) by combining crude MDI with a polyoxyethylene glycol having an average molecular weight of from 200 to 600.

According to DE AS No. 26 24 526 (GB Pat. No. 1,550,325), crude MDI prepared in a special process and having 88 to 95 percent by weight MDI is reacted with polyoxypropylene glycol in the molecular weight range from 134 to 700.

DE Published application Nos. 25 13 796 (GB Pat. No. 1,444,192) and 25 13 793 (GB 1,450,660) relate to crude MDI compounds in which the crude MDI was modified with specified amounts of alkylene or polyoxyalkylene glycols.

The cited alkylene or polyoxyalkylene glycols do indeed produce a liquification of the 4,4'-, and 2,4'-MDI isomers, which melt at 42° C. and 28° C., respectively. The disadvantage, though, is that the polyisocyanate compounds exhibit crystalline precipitates when stored for relatively long periods of time at temperatures around $-10°$ C.

The preparation of flexible polyurethane foams using crude MDI compounds modified with urethane groups as the polyisocyanate component is also known.

According to EP Published application No. 22 617, this is done by using as the isocyanate component the reaction product of a di- to tri-functional polyoxypropylene polyoxyethylene polyol having a polymerized oxyethylene group content of at least 50 percent by weight with excess crude MDI. Particular disadvantages of the described foams are their low tensile and tear strengths.

SUMMARY OF THE INVENTION

The purpose of the invention is the development of diphenylmethane diisocyanate-based liquid polyisocyanate mixtures which are storage-stable at low temperatures and suitable for the preparation of flexible polyurethane foams with improved mechanical properties.

These desired ends are achieved by reaction of diphenylmethane diisocyanate-based polyisocyanates with a polyoxypropylene polyoxyethylene polyol having 5 to 30 percent by weight oxyethylene content, a functionality of 2 to 4, and a hydroxyl number of 10 to 65.

Such liquid, urethane group-containing diphenylmethane diisocyanate-based polyisocyanate mixtures having an isocyanate group content of 12 to 30 percent by weight are obtained by reaction at a temperature of 0° C. to 100° C. of (a) at least one polyoxypropylene polyoxyethylene polyol having a functionality of 2 to 4, a hydroxyl number of 10 to 65, and 5 to 30 percent by weight of oxyethylene based on the total weight of the polyol with (b) a polyisocyanate selected from the group consisting of
  (1) a mixture of isomeric diphenylmethane diisocyantes and polyphenyl polymethylene polyisocyanates containing from 60 to 95 percent by weight of diphenylmethane diisocyanate, and
  (2) isomeric diphenylmethane diisocyanates containing 50 to 100 percent by weight of the 4,4'-isomer, with the proviso that when the isocyanate mixture (1) is used, the polyol and isocyanate are reacted in a ratio to provide 0.001 to 0.19 equivalent of hydroxyl group per equivalent of isocyanate group and, when the isocyanate (2) is used, the polyol and isocyanate are reacted in a ratio to provide 0.001 to 0.20 equivalent hydroxyl group per equivalent isocyanate group followed by dilution of the reaction product with 10 to 60 percent by weight of a diphenylmethane dissocyanate-polyphenyl polymethylene polyisocyanate mixture containing 45 to 80 percent by weight of diphenylmethane diisocyanate.

The liquid, urethane group-containing polyisocyanate mixtures in accordance with the invention are storage stable at temperatures around 0° C. Even when stored at −10° C., no sedimentation was observed after several weeks.

Flexible polyurethane foams prepared with the polyisocyanate mixtures in accordance with the invention unexpectedly exhibited improved utilization-related characteristics, in particular, improved elongation and improved tensile and tear strengths.

DESCRIPTION OF THE PREFERRED EMBODIMENTS

The liquid, urethane group-containing polyisocyanate mixtures are prepared by reaction of certain polypropylene polyethylene polyols with (1) a mixture of diphenylmethane diisocyanates and polyphenyl polymethylene polyisocyanates or (2) diphenylmethane diisocyanates followed by dilution with a mixture of diphenylmethane diisocyanates and polyphenyl polymethylene polyisocyanates. The starting materials used in the practice of this invention are as follows.

The polyoxypropylene polyoxyethylene polyols which can be used as modifying agents in accordance with the invention possess functionalities from 2 to 4, preferably from 2.5 to 3, hydroxyl numbers from 10 to 65, preferably from 20 to 45, and polymerized ethylene oxide group contents from 5 percent by weight to 30 percent by weight, preferably from 8 percent by weight to 20 percent by weight, relative to the total weight of polymerized ethylene oxide and propylene oxide. The polymerized ethylene oxide groups can be present in a random distribution or as blocks. Such polyoxyethylene blocks can be located internally in the ether chain or, preferably, in terminally bonded positions. The subject polyoxypropylene polyoxyethylene polyols contain up to 20 percent by weight, preferably from 3 to 15 percent by weight, of the terminally positioned polymerized ethylene oxide groups, based on the weight of the polymerized ethylene oxide and propylene oxide. Because of their low oxyethylene unit content, these products are characterized by improved miscibility with the cited aromatic polyisocyanates.

The polyoxypropylene polyoxyethylene polyols can be used individually or as mixtures. The starter molecules used for the preparation of the polyoxypropylene polyoxyethylene polyols in the presence of basic catalysts are, in addition to water, di- to tetra-functional, preferably di- to tri-functional, polyols. Typical examples are: ethylene glycol, 1,2- and 1,3-propylene glycol, diethylene glycol, dipropylene glycol, 1,4-butylene glycol, 1,6-hexamethylene glycol, glycerine, trimethylolpropane and pentaerythritol.

Basic catalysts which can be used in the preparation of the polyoxypropylene polyoxyethylene polyols are alkali alkoxides with from 1 to 4 carbon atoms in the alkyl remainder, such as sodium methylate, sodium and potassium ethylate, potassium isopropylate, and sodium butylate, alkali earth hydroxides, such as calcium hydroxide and, preferably, alkali hydroxides such as lithium, cesium, and, preferably, sodium and potassium hydroxide.

Suitable mixtures of diphenylmethane diisocyanates and polyphenyl polymethylene polyisocyanates contain from 40 percent by weight to 95 percent by weight isomeric diphenylmethane diisocyanates in addition to higher molecular weight analogues. If the polyisocyanate mixtures of this invention are prepared using isocyanate mixture (1), then it is preferable to use a mixture with a diphenylmethane diisocyanate content of from 60 percent by weight to 95 percent by weight, more preferably from 70 percent by weight to 90 percent by weight.

By contrast, crude MDIs with a diphenylmethane diisocyanate content of from 45 percent by weight to 80 percent by weight, preferably from 50 percent by weight to 70 percent by weight, are used for diluting the urethane group-containing polyisocyanate mixtures prepared using isomeric diphenylmethane diisocyanates.

It is desirable for the latter mixtures of diphenylmethane diisocyanate isomers to contain from 50 percent by weight to 96 percent by weight, preferably from 60 percent by weight to 85 percent by weight, 4,4'-MDI, from 50 percent by weight to 2 percent by weight, preferably from 40 percent by weight to 14 percent by weight, 2,4'-MDI, and from 0 percent by weight to 2 percent by weight, preferably from 0 percent by weight to 1 percent by weight, 2,2'-MDI. Instead of the MDI isomer mixture, pure 4,4'-MDI can also be used. However, since MDI isomer mixtures offer superior flowability, their use is preferred.

To prepare the urethane group-containing liquid polyisocyanate mixtures using the isocyanate mixture (1), the crude MDI and the polyoxypropylene polyoxyethylene polyol are reacted at temperatures from 0° C. to 100° C., preferably from 30° C. to 80° C., in such amounts that the ratio of the isocyanate-to-hydroxyl groups is from 1:0.001 to 1:0.19, preferably from 1:0.01 to 1:0.1. After a reaction time of from 0.5 to 6 hours, preferably from 1 to 3 hours, the storage-stable polyisocyanate mixture is allowed to cool.

However, if the polyisocyanate mixtures of this invention are primarily used for the preparation of flexible polyurethane foams, an alternative procedure is preferred. Here, 4,4'-MDI or, preferably, the MDI isomer mixture and the polyoxypropylene polyoxyethylene polyol are reacted at temperatures from 0° C. to 100° C., preferably from 30° C. to 80° C. in such amounts that the ratio of isocyanate groups to hydroxyl groups is from 1:0.001 to 1:0.2, preferably from 1:0.02 to 1:0.15. After a reaction time of from 0.5 to 6 hours, preferably from 1 to 3 hours, the product is allowed to cool at temperatures from 20° C. to 80° C. and is diluted to an isocyanate group content of from 12 percent by weight to 30 percent by weight using crude MDI. When from 40 parts by weight to 90 parts by weight of the MDI containing urethane groups are used for this, generally from 60 parts by weight to 10 parts by weight crude MDI are necessary.

The liquid polyisocyanate mixtures containing urethane groups of this invention are storage-stable at temperatures down to −10° C.

As already stated, the polyisocyanate mixtures of this invention are particularly suited for the preparation of flexible polyurethane foams. The polyisocyanate mixtures of this invention are reacted for this purpose with standard polyhydroxyl compounds in the presence of blowing agents and catalysts as well as, in some instances, auxiliaries and/or additives in open or closed molds.

The polyhydroxyl compounds used for this are preferably linear and/or branched polyester polyols and, more preferably, polyether polyols, with molecular weight from 200 to 8000, preferably from 800 to 5000, and more preferably from 1800 to 3500. However, other polymers containing hydroxyl groups and having the above-cited molecular weights can also be used, for example, polyester amides, polyacetals, and/or polycarbonates, in particular those prepared from diphenyl carbonate and 1,6-hexanediol by means of ester interchange.

The polyester polyols can be prepared, for example, from dicarboxylic acids, preferably aliphatic dicarboxylic acids with from 2 to 12, preferably 4 to 8, carbon atoms in the alkylene residue and from polyfunctional alcohols, preferably diols. Representative are aliphatic dicarboxylic acids such as glutaric acid, pimelic acid, suberic acid, azelaic acid, sebacic acid, undecanedioic acid, dodecanedioic acid and, preferably, succinic acid and adipic acid; and aromatic dicarboxylic acids such as phthalic acid and terephthalic acid. Representative for polyfunctional, in particular di- or tri-functional alcohols are: ethylene glycol, diethylene glycol, 1,2- or 1,3-propylene glycol, dipropylene glycol, 1,10-decanediol, glycerine, trimethylolpropane, and, preferably, 1,4-butanediol and 1,6-hexanediol. When polyfunctional, in particularly tri-functional, alcohols are also used to prepare the polyester polyols, the alcohol content can efficaciously be calculated such that the functionality of the resulting polyesterols is 6 at the maximum, preferably from 2 to 4.

The polyester polyols have molecular weights from 500 to 2800, preferably from 1000 to 2000, and hydroxyl numbers from 40 to 280, preferably from 50 to 120.

However, polyether polyols are preferred for use as the polyhydroxyl compounds. Said polyether polyols are prepared from one or more alkylene oxides with from 2 to 4 carbon atoms in the alkylene residue and from an initiator which contains from 2 to 4, preferably from 2 to 3, active hydrogen atoms.

Suitable alkylene oxides are, for example, 1,2-propylene oxide, 1,2- or 2,3-butylene oxide, styrene oxide and, preferably, ethylene oxide and 1,2-propylene oxide. The alkylene oxides can be used singly or in combination, alternating in sequence, or as mixtures.

Representative initiators are: water; organic dicarboxylic acid, such as succinic acid, adipic acid, phthalic acid and terephthalic acid; aliphatic and aromatic diamines, in some cases N-mono-, N,N- and N,N'-dialkyl-substituted with from 1 to 4 carbon atoms in the alkyl residue, such as, for example, mono- and dialkyl-substituted ethylenediamine, diethylenetriamine, triethylenetetramine, 1,3-propylenediamine, 1,3- or 1,4-butylenediamine, 1,2-, 1,3-, 1,4-, 1,5-, and 1,6-hexanediamine, phenylenediamines, 2,4- and 2,6-toluylenediamine, and 4,4'-, 2,4'- and 2,2'-diaminodiphenylmethane; monoamines, such as methylamine, ethylamine, isopropylamine, butylamine, benzylamine, aniline, the toluidines and naphthylamines. Of the compounds in this group, the following are particularly interesting: N,N,N',N'-tetrakis-(2-hydroxyethyl)ethylenediamine, N,N,N',N'-tetrakis-(2-hydroxypropyl)ethylenedimine, N,N,N',N'',N''-pentakis-(2-hydroxypropyl-)diethylenetriamine, phenyldiisopropanolamine and higher molecular weight alkylene oxide adducts of aniline.

The following can also be used as starter molecules: alkanolamines, such as ethanolamine, diethanolamine, N-methyl- and N-ethyldiethanolamine, N-methyl- and N-ethyldipropanolamine and triethanolamine, hydrazine and hydrazides. Preferably, polyfunctional, in particular bi- and/or tri-functional alcohols, such as ethylene glycol, 1,2- and 1,3-propanediol, diethylene glycol, dipropyl glycol, 1,4-butylene glycol, 1,6-hexamethylene glycol, glycerine, trimethylolpropane and pentaerythritol.

Among the polyesteramides are, for example, the primarily linear condensates obtained from polyfunctional saturated and/or unsaturated carboxylic acids or their anhydrides and polyfunctional saturated and/or unsaturated amino alcohols, or mixtures of polyfunctional alcohols and amino alcohols and/or polyamines.

Representative polyacetals are compounds which can be prepared from glycols, such as diethylene glycol, triethylene glycol, 4,4'-di(hydroxyethoxy)diphenyl-dimethylmethane, hexanediol, and formaldehyde. Suitable polyacetals can also be prepared by polymerizing cyclic acetals.

The polycarbonates containing hydroxyl groups are those of the generally known type, which can be prepared, for example, by the conversion of diols, such as 1,3-propanediol, 1,4-butanediol, and/or 1,6-hexanediol, diethylene glycol, triethylene glycol, tetraethylene glycol with diaryl carbonates, for example, diphenyl carbonate, or phosgene.

The polyhydroxyl compounds can be used individually or in the form of mixtures. Among those which have proven to be effective are mixtures of polyester polyols and polyether polyols, whereby the ratio of the components can vary across a wide range depending upon the intended application of the polyurethane foam being produced, for example, in a polyester polyol-to-polyether polyol weight ratio of from 20:80 to 80:20.

It may also be desirable to use additional chain extenders or cross-linking agents to prepare the polyurethane foams in addition to the cited polyhydroxyl compounds. Such agents are polyfunctional, in particular di-and tri-functional compounds with molecular weights from 17 to 600, preferably from 60 to 300. For example, di- and trialkanolamines are used, such as diethanolamine and triethanolamine, aliphatic and aromatic diamines, such as ethylenediamine, 1,4-butylenediamine, 1,6-hexamethylenediamine, 4,4'-diaminodiphenylmethane, 3,3'-dialkyl-substituted 4,4'-diaminodiphenylmethanes, 2,4- and 2,6-toluylenediamine and, preferably, aliphatic diols and triols with from 2 to 6 carbon atoms, such as ethylene glycol, 1,4-butylene glycol, 1,6-hexamethylene glycol, glycerine, and trimethylolpropane.

If chain extenders or cross-linking agents are used, they are utilized in amounts ranging from 1 to 60 parts by weight, preferably 10 to 30 parts by weight, per 100 parts by weight polyhydroxyl compounds.

Among the blowing agents which can be used in the process in accordance with the invention is, preferably, water, which reacts with isocyanate groups to form carbon dioxide. The amounts of water which can efficaciously be used are from 0.1 to 8 parts by weight, preferably from 1.5 to 5 parts by weight, based on 100 parts by weight polyhydroxyl compound.

In addition to water, physical acting blowing agents can be used. Suited for this purpose are liquids which are inert relative to the polyisocyanate mixtures of this invention and which have boiling points under 100° C., preferably under 50° C., in particular between −50° C. and 30° C. at atmospheric pressure, so that they evaporate under the influence of the exothermic polyaddition reaction. Examples of such liquids are hydrocarbons such as pentane, n- and iso-butane and propane, ethers such as dimethylether and diethylether, ketones such as acetone and methyl ethyl ketone, ethyl acetate and, preferably, halogenated hydrocarbons, such as methylene chloride, trichlorofluoromethane, dichlorodifluoromethane, dichloromonofluoromethane, dichlorotetrafluoroethane and 1,1,2-trichloro-1,2,2-trifluoroethane.

Mixtures of these low-boiling point liquids with one another and/or with other substituted or unsubstituted hydrocarbons can be used.

The required amount of physically active blowing agents in addition to water can be determined as a function of the desired foam density in a simple manner. It is approximately from 0 to 50 parts by weight, preferably from 0 to 20 parts by weight, per 100 parts by weight polyhydroxyl compound. In some cases, it may be desirable to mix the polyisocyanate mixtures of this invention with the physically active blowing agent, thus lowering viscosity.

In order to accelerate the reaction between the polyhydroxyl compounds, water, and, in some cases, chain extenders for cross-linking agents, and the diphenylmethane diisocyanate-based polyisocyanate mixtures of this invention, standard polyurethane catalysts are incorporated in the reaction mixture. Preferably, basic polyurethane catalysts are used, for example, tertiary amines, such as dimethylbenzylamine, dicyclohexylmethylamine, dimethylcyclohexylamine, N,N,N',N'-tetramethyldiaminodiethyl ether, bis(dimethylaminopropyl)urea, N-methyl- or N-ethylmorpholine, dimethylpiperazine, pyridine, 1,2-dimethylimidazole, 1-azobicyclo-(3,3,0)-octane, dimethylaminoethanol, 2-(N,N-dimethylaminoethoxy)ethanol, N,N ,N"-tris(-dialkylaminoalkyl)hexahydrotriazines, for example, N,N',N"-tris(dimethylaminopropyl)-s-hexahydrotriazine and, in particular, triethylenediamine. However, metal salts are also suitable, such as iron (II) chloride, zinc chloride, lead octoate, and, preferably, tin salts, such as tin octoate, tin diethylhexoate, and dibutyltin dilaurate, as well as, in particular, mixtures of tertiary amines and organic tin salts. Effective amounts to be used are 0.1 to 10 percent by weight, preferably 0.5 to 5 percent by weight of the tertiary amines, and/or from 0.01 to 0.5 percent by weight metal salts, preferably from 0.05 to 0.25 percent by weight, based on the weight of polyhydroxyl compounds.

Auxiliaries and additives can also be incorporated in the reaction mixture. Typical are stabilizers, agents to protect against hydrolysis, cell development regulators, fungistatic and bacterostatic substances, dyes, pigments, fillers, surface-active substances and combustion retardants.

Typical of such additives are surfactants which aid in homogenizing the feed stocks and can also be suitable for regulating the cell structure of the foams. Some typical examples are siloxane oxyalkylene copolymers and other organic polysiloxanes, oxyethylated alkyl phenols, ethoxylated fatty alcohols, paraffin oils, ricinus oil or esters of ricinus oil and Turkey Red oil which are used in amounts from 0.2 to 8 parts by weight, preferably from 0.5 to 5 parts by weight, per 100 parts by weight polyhydroxyl compound.

Typical combustion retardants are compounds containing phosphorus and/or halogen atoms, such as tricresol phosphate, tris-2-chloroethyl phosphate, trischloropropyl phosphate, and tris-2,3-dibromopropyl phosphate.

In addition to the above-noted halogen-substituted phosphates, inorganic combustion retardants can also be used, such as antimony trioxide, arsenic oxide, ammonium phosphate, and calcium sulfate, or melamine can be used to inhibit combustion in the polyurethane foams.

In general, it has been found to be advantageous to use from 5 to 50 parts by weight, preferably from 5 to 25 parts by weight, of the cited combustion retardants per 100 parts by weight polyhydroxyl compound.

To prepare the flexible polyurethane foams, the polyisocyanate mixtures of this invention, the polyhydroxyl compounds and, in some cases, chain extending and cross-linking agents are reacted in the presence of catalysts, blowing agents and, in some cases, auxiliaries and/or additives at temperatures of from 0° to 70° C., preferably from 15° to 50° C. The reactants are used in such ratios to provide from 0.5 to 2, preferably from 0.8 to 1.3, and, more preferably, approximately one isocyanate group per reactive hydrogen atom present.

The flexible polyurethane foams are prepared with the one-shot method, whereby the initial components, auxiliaries, and additives are individually fed into a mixing chamber with several feed nozzles and are intensively mixed together in said mixing chamber. However, it has been found to be particularly efficacious to use a two-shot process, which is the preferred process, and to combine the polyhydroxyl compound, catalysts, blowing agents, and, in some cases, chain extenders or cross-linking agents, auxiliaries, and/or additives in the so-called A component and to use the polyisocyanate mixtures of this invention, in some cases in mixture with the physically acting blowing agents, auxiliaries, and/or additives, as the B component. One advantage of this process is that the A and B components can be transported in a space-saving manner and can be stored for a limited time, only needing to be intensively mixed together prior to preparation of the flexible polyurethane foams.

The flexible polyurethane foams prepared from the liquid polyisocyanate mixtures containing urethane groups have densities from 10 to 150 kg/m$^3$, preferably from 20 to 70 kg/m$^3$, and they exhibit increased elongation and improved tensile and tear strength.

All parts and percentages are by weight and all temperatures are in degrees centigrade unless otherwise indicated.

EXAMPLE 1

Preparation of the polyisocyanate mixture based on diphenylmethane diisocyanate

To a mixture comprising 38.2 parts 4,4'-MDI and 19.7 parts 2,4'-MDI were added, while stirring at 70° C., 19.1 parts of a polyoxypropylene polyoxyethylene triol initiated with glycerine, said triol having a hydroxyl number of 42 and a total polymerized oxyethylene group content of 11 percent by weight, of which 6 percent by weight was polymerized in the terminal position.

After a post-addition reaction period of 2 hours at 70° C., the urethane group-containing MDI was allowed to cool to room temperature and the reaction mixture was diluted with 30 parts crude MDI having an isocyanate content of 31 percent.

The resulting polyisocyanate mixture had an isocyanate content of 25.1 parts by weight and did not exhibit sedimentation after being stored 14 days at −10° C.

COMPARISON EXAMPLE A

Preparation of prior art polyisocyanate mixture

The procedure outlined in Example 1 was followed, except a different glycerine-initiated polyoxypropylene polyoxyethylene triol was used as the polyoxypropylene polyoxyethylene polyol, said triol was comprised of a statistical distribution of 25 percent by weight polymerized oxypropylene groups and 75 percent by weight polymerized oxyethylene groups.

After storage three days at −10° C., the resulting polyisocyanate mixture exhibited marked sedimentation.

EXAMPLE 2

Preparation of flexible polyurethane foams

Component A: a mixture of
- 100 parts of a glycerine-initiated polyoxypropylene polyoxyethylene triol with 13.5 percent by weight terminally polymerized oxyethylene groups and a hydroxyl number of 38,
- 2.8 parts water,
- 0.6 parts triethylenediamine (33 percent by weight in dipropylene glycol),
- 0.3 parts bis(N,N-dimethylaminoethyl)ether,
- 0.8 parts triethanolamine,
- 0.2 parts silicone stabilizer B 4690 (source: Goldschmidt, Essen), and
- 8 parts trichlorofluoromethane.

Component B: Polyisocyanate mixture from Example 1

Component A and Component B were mixed together intensively at 25° C. for 10 seconds at a weight ratio of 100 parts A to 51.3 parts B.

Seven hundred and thirty-six grams of the expandable reaction mixture were placed in a rectangular metal mold having a mold volume of 16 liters, which was preheated to 40° C. The metal mold was closed and the reaction mixture allowed to expand.

The mechanical properties summarized in the following table were obtained for the resulting flexible polyurethane foam.

COMPARISON EXAMPLE B

Preparation of a flexible polyurethane foam based on prior art polyisocyanate mixture Component A in accordance with Example 2.
Component B in accordance with Comparison Example A.

The preparation of the flexible polyurethane foam was completed according to the procedure given in Example 2.

The mechanical properties obtained with the resulting foam are summarized in the following table.

TABLE

| Flexible Polyurethane Foam in Accordance With | | Example 2 | Comparison Example B |
|---|---|---|---|
| Density | (kg/m$^3$) | 46 | 46 |
| Tensile strength in accordance with DIN 53 571 | (kPa) | 80 | 40 |
| Elongation in accordance with DIN 53 571 | (%) | 102 | 75 |
| Tear strength in accordance with DIN 53 575 | (N/mm) | 0.31 | 0.21 |
| Indentation hardness at 40% compression in accordance with DIN 53 576 | (N) | 179 | 169 |
| Compression set in accordance with DIN 53 572 | (%) | 5.3 | 6.5 |
| Appearance: | | Fine, uniform cell structure | Coarse cells |

The results show that flexible polyurethane foam produced with the polyisocyanate mixture in accordance with the invention offers improved applications-related characteristics, in particular significantly improved tensile strength, tear strength, and elongation.

EXAMPLE 3

Preparation of the polyisocyanate mixture based on diphenylmethane diisocyanate

To a mixture consisting of
- 45 parts 4,4'-MDI
- 45 parts 2,4'-MDI and
- 10 parts crude MDI with an MDI isomer content of 44 percent by weight, a mixture consisting of
- 8.9 parts of a 1,2-propanediol-initiated polyoxypropylene polyoxyethylene diol with a hydroxyl number of 28 and a total polymerized, terminally positioned oxyethylene group content of 18 percent by weight, and
- 8.9 parts of a glycerine-initiated polyoxypropylene-polyoxyethylene triol with a hydroxyl number of 28 and a total polymerized, terminally positioned oxyethylene group content of 14 percent by weight was added while stirring at 50° C.

After a post-addition reaction time of two hours at 70° C., the urethane group-containing polyisocyanate mixture was cooled to room temperature. The product had an isocyanate content of 27.8 percent by weight and exhibited no sedimentation after 14 days storage at −10° C.

EXAMPLE 4

The procedure used in Example 3 was followed, however, the starting materials were a mixture comprising
- 35 parts 4,4'-MDI,
- 15 parts 2,4'-MDI, and
- 50 parts crude MDI with an MDI-isomer content of 44 parts by weight, and
- 139 parts of a glycerine-initiated polyoxypropylene polyoxyethylene triol with an OH number of 35 and a total polymerized, terminally positioned oxyethylene group content of 13.8 percent by weight.

The product had an isocyanate content of 12.1 percent by weight and exhibited no sedimentation after 14 days storage at −10° C.

EXAMPLE 5

According to the procedure of Example 1, a mixture consisting of 75 parts 4,4'-MDI and 25 parts 2,4'-MDI was reacted with 41 parts of a glycerine-initiated polyoxypropylene polyoxyethylene triol with a hydroxyl number of 42 and a total polymerized oxypropylene group content of 86 percent by weight and a total polymerized oxyethylene group content of 14 percent by weight present in a random distribution.

The resulting urethane group-containing MDI was mixed with 60 parts crude MDI at room temperature, said crude MDI having an isocyanate content of 31 percent by weight. The resulting polyisocyanate mixture had an isocyanate content of 24.6 percent by weight and exhibited no sedimentation after aging 14 days at −10° C.

EXAMPLE 6

Preparation of a flexible polyurethane foam

Component A: a mixture consisting of
91 parts of a glycerine-initiated polyoxypropylene-polyoxyethylene triol with a hydroxyl number of 28 and a total polymerized, terminally positioned oxyethylene group content of 14 percent by weight
2.6 parts water
0.19 parts bis(dimethylamino)ethyl ether
0.57 parts triethylenediamine (33 percent by weight in dipropylene glycol)
1.00 parts 1,4-butanediol
0.3 parts silicone stabilizer B 4690 (Goldschmidt, Essen) and
4.34 parts trichlorofluoromethane.

Component B: Polyisocyanate mixture in accordance with Example 5

Component A and Component B were intensively mixed together for 10 seconds at 25° C. in a weight ratio of 100 parts A to 69 parts B.

Eight hundred grams of this expandable reaction mixture was placed in a rectangular metal mold heated to 50° C. with a mold volume of 16 liters. The mold was closed and the reaction mixture allowed to expand.

The result was an elastic foam which exhibited the following mechanical properties:

| | | |
|---|---|---|
| Density | (kg/m³) | 48 |
| Tensile strength in accordance with DIN 53 571 | (k.Pa) | 150 |
| Elongation in accordance with DIN 53 571 | (%) | 114 |
| Tear strength in accordance with DIN 53 575 | (N/mm) | 0.5 |
| Compression strength in accordance with DIN 53 577 | (k.Pa) | 5.4 |
| Compression set in accordance with DIN 53 572 | (%) | 7 |

The embodiments of the invention in which an exclusive privilege or property is claimed are defined as follows:

1. A liquid, urethane group-containing diphenylmethane diisocyanate-based polyisocyanate mixture having an isocyanate group content of 12 to 30 percent by weight obtained by reaction at a temperature of 0° C. to 100° C. of
   (a) at least one polyoxypropylene polyoxyethylene polyol having a functionality of 2 to 4, a hydroxyl number of 10 to 65, and 5 to 30 percent by weight of oxyethylene based on total weight of the polyol with
   (b) a polyisocyanate selected from the group consisting of:
      (1) a mixture of isomeric diphenylmethane diisocyanates and polyphenyl polymethylene polyisocyanate, containing from 60 to 95 percent by weight of diphenylmethane diisocyanates, and
      (2) isomeric diphenylmethane diisocyanate containing 50 to 100 percent by weight of the 4,4'-isomer,
   with the proviso that when the isocyanate mixture (1) is used, the polyol and the isocyanate are reacted in a ratio to provide from 0.001 to 0.19 equivalent hydroxyl group per equivalent of isocyanate group and when the isomeric diphenylmethane diisocyanates (2) are used, the polyol and the isocyanate are reacted in a ratio to provide from 0.001 to 0.19 equivalent hydroxyl group per equivalent isocyanate group followed by dilution of the reaction product with 10 to 60 percent by weight of a diphenylmethane diisocyanate-polyphenyl polymethylene polyisocyanate mixture containing 45 to 80 percent by weight of diphenylmethane diisocyanates.

2. The liquid, urethane group-containing polyisocyanate mixture of claim 1 wherein the polyoxypropylene polyoxyethylene polyol has a functionality of 2.5 to 3.

3. The liquid, urethane group-containing polyisocyanate mixture of claim 1 wherein the polyoxypropylene polyoxyethylene polyol contains up to 20 percent by weight, based on the total weight of polyol, of oxyethylene groups in a terminally bonded position.

4. The liquid, urethane group-containing polyisocyanate mixtures of claim 1 wherein the mixture of diphenylmethane diisocyanates and polyphenyl polymethylene polyisocyanates contains 40 to 95 percent by weight of diphenylmethane diisocyanates.

5. The liquid, urethane group-containing polyisocyanate mixtures of claim 1 wherein the mixture of diphenylmethane diisocyanate isomers used contains
   50 to 100 percent by weight of 4,4'-diphenylmethane diisocyanate
   50 to 2 percent by weight of 2,4'-diphenylmethane diisocyanate, and
   0 to 2 percent by weight of 2,2'-diphenylmethane diisocyanate.

6. Flexible polyurethane foams prepared using the liquid, urethane group-containing polyisocyanate mixtures of claim 1.

* * * * *